United States Patent
Follett

[15] 3,645,286
[45] Feb. 29, 1972

[54] SAFETY VALVE FOR LIQUID PRESSURE CYLINDERS

[72] Inventor: John Le Roy Follett, Richmond Ave., Fair Haven, N.Y. 13064

[22] Filed: May 29, 1969

[21] Appl. No.: 828,982

[52] U.S. Cl..............................137/68, 137/460, 137/614.2, 222/3, 251/210
[51] Int. Cl.......................................................F16k 17/28
[58] Field of Search.................137/68, 329.4, 460, 462, 498, 137/614.19, 614.2, 629, 630, 614.11–614.21, 517, 519, 519.5; 222/3; 73/333

[56] References Cited

UNITED STATES PATENTS

| | | | |
|---|---|---|---|
| 1,411,483 | 4/1922 | Floyd | 137/68 |
| 2,249,848 | 7/1941 | O'Brien | 137/797 X |
| 2,403,777 | 7/1946 | Yanka | 251/210 |
| 3,126,912 | 3/1964 | Clark et al. | 137/460 X |

FOREIGN PATENTS OR APPLICATIONS 550,424  10/1956  Italy......................137/614.2

*Primary Examiner*—Nelson M. Cary
*Assistant Examiner*—Richard Gerard
*Attorney*—F. P. Keiper

[57] ABSTRACT

Valve for use with liquid pressure gas cylinders comprising a valve body having a shank threaded into the cylinder, and having a central bore leading to a valve seat, and a manually actuated valve movable into sealing engagement with the seat, a safety valve located on the inner end of the shank and connecting with the bore, the safety valve being adapted to seal the bore against outflow of gas at an abnormal rate, and means responsive to final closing movement of the valve member for opening the safety valve seal.

9 Claims, 8 Drawing Figures

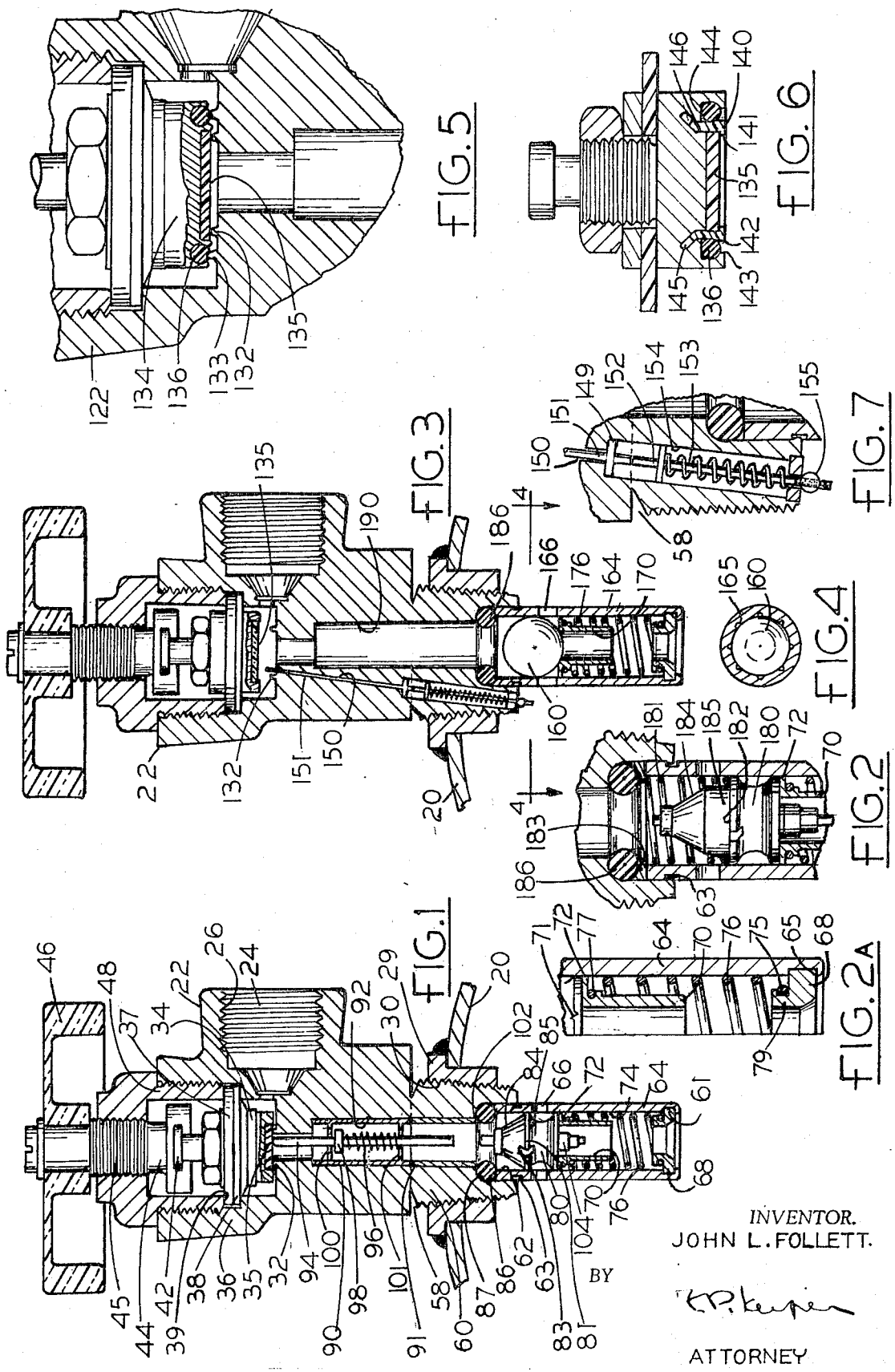

SAFETY VALVE FOR LIQUID PRESSURE CYLINDERS

This invention relates to safety valve construction for pressure cylinders.

In the application of valves to pressure cylinders or tanks of the type used for liquefied gases under pressure and particularly inflammable or explosive gases including oxygen, there is always a danger of the valve being struck in such a way as to be broken from the cylinder, or of a pipeline severed by the valve rupturing, whereby gas may escape at a rapid rate from the cylinder. Where a valve is broken off or a pipeline broken, the escaping gas creates a jet propulsion effect of considerable force and sufficient to cause dangerous movements of the cylinder.

The present invention is directed to a safety valve construction disposed in a protected position within the cylinder, and capable of sealing the cylinder should the valve be broken from the cylinder, or any unusual discharge from the cylinder take place through the valve as would occur upon pipeline rupture. The invention further has to do with a valve structure which will maintain the cylinder sealed, until any rupture has been repaired, so that a predetermined or normal rate of flow from cylinder is restored.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 1 is a sectional view of a valve applied to a cylinder and showing the safety feature;

FIG. 2 is a fragmentary sectional view of a slight modification, the valve being in filling position;

FIG. 2a is a fragmentary sectional view of a constructional detail;

FIG. 3 is a sectional view of a modification of the valve and safety feature of FIG. 1;

FIG. 4 is a sectional detail view taken on the line 4-4 of FIG. 3;

FIG. 5 is an enlarged sectional view of a further modified form applicable to either of the forms shown in FIGS. 1-4;

FIG. 6 is a sectional view of the valve element of FIG. 5, and

FIG. 7 is an enlarged fragmentary detail of the relief valve in FIG. 3.

Referring to FIG. 1, there is shown the head of liquid gas pressure cylinder 20, having a valve 22 to control the flow to and from the cylinder. The valve has an outflow passage 24 threaded as at 26 to receive a gland sleeve. The valve is threaded as at 30 into a bushing 29 welded in the cylinder 20. The valve is provided with an annular valve seat 32, against which a valve member 34 having a sealing washer 35 is urged to seal off or close the valve. The member 34 is provided with a flexible annular gasket 38, the outer edge of which is clamped against the annular shoulder seat 36, by a pressure ring 37 engaging the inner end 39 of the valve bushing 48. The valve member 34 is swivelly coupled as at 42 to the threaded stem 44 of the manual operator 46, the stem 44 being threaded in the end bushing 48 of the valve as at 45.

The valve body is provided with an annular V-groove 58 to provide an annular break away weak zone so that should the valve be struck by a blow of sufficient force to damage the valve, the threaded shank 60 would break at 58.

Wholly within the tank, and mounted in the stepped counterbore 62 of the valve shank 60, is a valve sleeve 64 having side ports 66, and an annular internal shoulder ring 68 in the base. A sleeve 70 having an outer annular shoulder 72 is slidably disposed in the internal bore 74 of the sleeve 64 and yieldingly held in position by the compression spring 76. The upward travel of the sleeve 70 is restricted by the tension of spring 76, and normally rests with the upper surface of the shoulder 72 a little below the ports 66. A valve element 80 having a conical upper end 84, and an annular groove 85 therebelow, freely slides in the bore of the sleeve 64. The conical end 84 of the valve element is adapted to seat on the inside toroidal surface of an O-ring seat 86, which may be of neoprene as shown, or a metallic or other suitable seat may be employed. The outer toroidal surface of the O-ring is abutted by the upper surface of the sleeve 64 and lies in the groove formed by the step 87 in the bore 62.

Should the valve body be broken off at the break annulus 58, the element 80 is subject to a differential pressure, between the pressure within the cylinder and the atmospheric pressure thereabove due to the break, and the valve element is immediately caused to seat on the ring 86, and seal off the cylinder. Should the valve member 34 be in open position, and a break occur in the outlet line, such as by the bursting or the detachment of a hose, or the rupture of piping, a similar differential pressure or a differential pressure greater than that resulting from a predetermined flow will cause the valve element 80 to seat on the ring 86 and seal the cylinder.

Within the reduced diameter portion 90 of the valve bore 62 is a guide sleeve 92 for an axial slideable valve actuated rod 94 which is normally urged upwardly by a light spring 96 so that the annular shoulder 98 affixed to the rod engages the upper guide spider 100 affixed within the sleeve 92. The lower end of the spring bears against the lower spider 101. The lower end of the pin when its shoulder 98 is moved away from the spider 100 is adapted to engage the tip end of the valve pin 102 of a Schrader-type air valve 104 disposed in the valve element 80. The rod 94 is of such a length, that when the conical surface 84 of the element 80 is seated on the O-ring 86, and the valve member 34 is seated with its washer 35 fully engaging the annular seat 32, in valve closed position, the washer 35 bears against and moves rod 94 downwardly to engage the pin 102 to open the valve 104. More particularly, the rod 94 is of such a length that it will not actuate valve 104 or contact its pin 102, when the end 84 is seated on the O-ring 86, except in the final movement of seating the washer 35 on the seat 32. When the valve 22 is open, the spring 96 lifts the rod 94 so that its lower end can not engage the valve pin 102, when the end 84 is seated on the O-ring 86.

It will be seen from the foregoing that once valve washer 35 is seated on its seat 32 to close off the flow, valve 104 is opened so that the pressure on opposite sides of the valve element 80 can equalize, whereupon the valve element 80 may drop back by gravity to the position shown in FIG. 1. Thus when the hose or line break has been corrected after closing the valve 22, the reopening of the valve 22 will restore and allow normal flow from the cylinder to the line. It will be noted that the sleeve 90 is held in position by a second sleeve 91, the lower end of which may bear against the O-ring 86. The sleeves 90 and 91 engage one another in the plane of the annular weakness groove 58, and thus will separate, should the valve be broken away from its shank 60.

To permit the cylinder to be filled at a rapid rate, the element 80 may move downwardly from the position shown in FIG. 1 against spring 76, to a point where the flange 81 is below the ports 66 in response to the inward rush of fluid the movement being limited by the sleeve 70 engaging the ring 68.

From the foregoing it will be seen that gas flow from the cylinder will be prevented in the event of a rupture in the line, until after the valve 22 has been closed, and the rupture repaired. Reopening of the valve will permit the valve 80 to reseat against the O-ring 86 upon any substantial outflow as would occur upon the reopening of the valve with a ruptured line. The valve element 80 may have a groove or grooves 83 in its flange 81 to permit a predetermined flow, if the clearance around the valve flange 81 is insufficient to provide a normal or predetermined flow.

It will be noted that the underside of the valve element 80 is exposed to the cylinder pressure through the central opening in the annular shoulder ring 68 to which the coil spring 76 is attached. The ends of the spring 76 are preferably recessed in shallow annular grooves 77 and 75 (FIG. 2A) on the sleeve 70 and the upstanding portion 79 of the shoulder forming element 68. The upper surface of the sleeve 70 is preferably provided with several radial notches 71 with raised edges to break up the surface and prevent surface to surface contact with the under face of the valve element 80, and thereby prevent any tendency of the valve to stick as might occur with surface to surface contact.

The valve construction thus described is adapted for use in cylinders whose outlet bushing 29 normally extends vertically, so that the valve element 80 may drop by gravity, except should the cylinder upset. The valve construction may be slightly modified to render it operative in any position, in which case the valve element 180, as shown in FIG. 2 may be urged downwardly by a light spring 181 bearing against a washer 183 lying against the O-ring 186, and a shoulder 182 formed on the element 180. In such case, the conical face 184 may be spaced from the shoulder 182 by a cylindrical section 185 to provide adequate clearance for the nested coils of the spring 181, when the conical seat 184 engages the O-ring 186 to form a seal.

The sleeve 64 may have an annular groove 63 into which metal from the valve nipple may be upset to hold the sleeve in place, and the annular insert 68 may be seated in an annular offset 61 in the lower end of the sleeve 64 and held in place by inwardly deforming the lower end of the sleeve 64 inwardly as indicated at 65.

Instead of employing the pushpin 94 and conical valve member 80, with its relief valve 104 as shown in FIG. 1, all of which are disposed within the bore of the valve leading to the valve seat 32, a relief valve may be disposed externally of the nipple bore as shown in FIG. 3, and if desired a sleeve 164 having a ball valve 160 may be employed in place of the conical valve 80 of FIG. 1.

Referring to FIGS. 3 and 7, there is shown, in an inclined bore 150, a pinlike rod 151 extending into the valve chamber inwardly of the seats 132. The lower end of such rod is adapted to engage the upper end of the valve pin 152 of a Schrader-type valve 153 disposed in an enlargement 154 of the bore 150, the pin 152 preferably engaging the rod 151 which may have a flat head 149, disposed in the plane of weakness 58. The valve 154 comprises a seat, and ball seal 155, opened by depressing the pin 152. The rod 151 is of such length as to engage the washer 135 just before the washer seats on the seat 132, and in the final closing movement which may be about 0.015 to 0.020 inches. Clearance in the bore 150 permits gas under pressure from the cylinder to flow into the valve chamber when the seal 135 is effected. Thus, whenever the seal has been effected, the pressure of the cylinder is introduced into the valve bore 190 through bore 150 to permit equalization of pressure on opposite sides of the valve ball 160, should it have been seated on the O-ring 186, by reason of a line rupture, to seal off the cylinder. The location of the ball, when unseated is established by the sleeve 170 and spring 176 as in FIG. 1, the ball being depressed below ports 166 from the position shown during charging of the cylinder. In practice the internal bore of the sleeve 164 may have one or more internal lengthwise grooves 165 as shown in FIG. 4, to permit predetermined flow from the cylinder without causing the ball to seat.

In FIGS. 5 and 6 the valve 122 is provided with a double seal, one of which provides a preliminary seal slightly before the final seal. In this arrangement, the valve seat comprises two concentric annular seal lips 132 and 133, and the valve member 134 is provided with a flat washer 135 to engage the annular lip 132 to form a final seal, and an O-ring 136, which is adapted to engage the annular lip 133, and provide a preliminary seal before the final seal is established, during the final approach of the valve member 134 toward the valve seat in closing the valve. In the construction of the valve member, the washer 135 and O-ring are held in position by a lockring 140, having an annular shoulder 141 to hold the washer 135 in place, and having a lip 142, cooperating with a lip 143 to hold the O-ring in place, in an otherwise rectangular section annular groove 144 formed in the valve member, and completed by the lockring 140. The valve body is provided with a conical annular wedge groove 145 against which the inside inward face of the lockring 140 engages, upon being pressed into position, which causes the outer edge 146 to flare outwardly into the wedge groove 145. The rectangular section channel 144 provides relief for O-ring distortion while in engagement with the annular seat 133.

Such a double seating arrangement may be used in either of the forms shown in FIG. 1 or FIG. 3 in place of the single seat 32 and washer 35 or seat 132 and washer 135 there shown. In FIG. 1 actuation of the rod 94 is effected after the preliminary seal of the O-ring and before the completion of the final seal when the washer 35 seats on the seat 32. The preliminary O-ring seal thus would prevent any slight leakage that might otherwise occur during the final closing movement of the single seat valve of FIG. 1, such final closing movement being in the order of 0.015 to 0.020 of an inch.

When applied to the form shown in FIG. 3, the operation is the same, the pin being engaged by the washer 135 after the initial O-ring seal has been effected through the O-ring 136 and the annular lip 133, but before the final seal has been effected by the washer 135. It will be understood that the upper end of the pin 151 will be located just inwardly of the annular lip 132.

While several forms of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a valve for use with pressure liquid gas cylinders comprising a valve body having a shank adapted for threading engagement with the cylinder, said shank having a central bore leading to a valve seat, and a valve member adapted to be moved into sealing engagement with said seat, a safety valve associated with the inner end of said shank biased to an open position and responsive to excess flow conditions in the bore to arrest flow therethrough, said safety valve having bore sealing means adapted to move into sealing relation to said bore to prevent outflow of gas into the bore at an abnormal rate, and means responsive only to final closing movement of said valve member toward the seat for establishing a bypass from one side of the safety valve to the other for equalizing the pressure on opposite sides of the bore sealing means to enable the safety valve to move to an open position terminating the seal formed by the bore sealing means upon closure of said valve member.

2. In a valve as set forth in claim 1 wherein the valve seat comprises spaced inner and outer annular seats, and the valve member is provided with means for preliminary engaging the outer seat before engaging the inner seat and the final closing movement of the valve against the inner seat.

3. In a valve as set forth in claim 2 wherein the means responsive to the final closing movement of the valve is directly engaged by the valve member inwardly of its inner seat.

4. In a valve as set forth in claim 1 wherein the means responsive to the final closing movement of the valve is directly engaged by the valve member inwardly of its seat.

5. In a valve as set forth in claim 1 wherein the safety valve comprises an annular seat shoulder adjacent the inner end of the bore, and a sleeve inserted in the bore having a valve element slidable in the sleeve to engage said seat shoulder.

6. In a valve as set forth in claim 5 wherein the means responsive to the final closing movement of the valve includes a relief valve in the valve element to permit equalization of pressure on opposite sides of the valve element while seated on the seat shoulder, to permit movement of the valve element from its seat.

7. In a valve as set forth in claim 5 wherein the means responsive to the final closing of the valve includes a passage in the valve body extending from the inner portion of the shank to a point inwardly of the seat, and a relief valve in the passage opened upon the final closing movement of the valve member.

8. In a valve as set forth in claim 1 wherein the shank is provided with an annular transverse groove to establish a plane of weakness for fracture of the shank externally of the portion adapted for threaded engagement with a cylinder and between the valve seat and the safety valve, and wherein the means responsive to final closing movement extends across the plane of weakness and is composed of parts readily separable substantially in the plane of weakness.

9. In a valve as set forth in claim 1 wherein the safety valve is within a cylinder.

* * * * *